(12) United States Patent
Duca et al.

(10) Patent No.: US 10,088,072 B2
(45) Date of Patent: Oct. 2, 2018

(54) SINGLE USE VALVES

(71) Applicant: SICPA HOLDING SA, Prilly (CH)

(72) Inventors: Nicola Duca, Monthey (CH); Yvan Wirz, Chexbres (CH)

(73) Assignee: SICPA HOLDING SA, Prilly (CH)

( * ) Notice: Subject to any disclaimer, the term of this patent is extended or adjusted under 35 U.S.C. 154(b) by 132 days.

(21) Appl. No.: 14/781,948

(22) PCT Filed: May 28, 2013

(86) PCT No.: PCT/EP2013/060945
§ 371 (c)(1),
(2) Date: Oct. 2, 2015

(87) PCT Pub. No.: WO2014/161608
PCT Pub. Date: Oct. 9, 2014

(65) Prior Publication Data
US 2016/0053915 A1 Feb. 25, 2016

Related U.S. Application Data

(60) Provisional application No. 61/808,950, filed on Apr. 5, 2013, provisional application No. 61/808,058, filed on Apr. 3, 2013.

(51) Int. Cl.
*F16K 35/02* (2006.01)
*F16K 1/30* (2006.01)
(Continued)

(52) U.S. Cl.
CPC ............... *F16K 35/02* (2013.01); *B41J 2/17* (2013.01); *B41J 2/17503* (2013.01);
(Continued)

(58) Field of Classification Search
CPC ...... B41J 2/17; B41J 2/17503; B41J 2/17596; F16K 35/00; F16K 35/02; F16K 35/022; F16K 35/16; F16K 1/307; F17C 7/02
See application file for complete search history.

(56) References Cited

U.S. PATENT DOCUMENTS 3,704,813 A   12/1972   Devol
4,573,611 A *   3/1986   O'Connor ............... F16K 1/36
                                                                           137/316
(Continued)

FOREIGN PATENT DOCUMENTS

CN    102095018    6/2011
CN    202188215    4/2012
(Continued)

OTHER PUBLICATIONS

Chinese Office Action in counterpart Chinese Application No. 201380075316.0 dated Nov. 30, 2016 (and English-language translation).

*Primary Examiner* — Timothy L Maust
*Assistant Examiner* — Timothy P Kelly
(74) *Attorney, Agent, or Firm* — Muncy, Geissler, Olds & Lowe, P.C.

(57) ABSTRACT

A single use valve structured to allow only one fluid or gas or powder filling or extraction operation of a container such that neither a subsequent refilling nor a subsequent extraction operation can be performed. The single use valve may be used for extraction of ink from, or filling of ink to, a security ink container.

29 Claims, 12 Drawing Sheets

(51) Int. Cl.
*B41J 2/175* (2006.01)
*B41J 2/17* (2006.01)
*F17C 7/02* (2006.01)

(52) U.S. Cl.
CPC ........... *B41J 2/17596* (2013.01); *F16K 1/307* (2013.01); *F16K 35/022* (2013.01); *F17C 7/02* (2013.01)

(56) References Cited

U.S. PATENT DOCUMENTS

| | | | | |
|---|---|---|---|---|
| 4,921,214 | A | * | 5/1990 | Jernberg ................. F17C 13/04 222/147 |
| 4,993,451 | A | | 2/1991 | Kremer |
| 5,018,552 | A | * | 5/1991 | Politi ..................... B65D 47/02 137/614.11 |
| 5,131,625 | A | * | 7/1992 | Hacker ..................... B01L 5/00 137/315.35 |
| 6,932,238 | B2 | | 8/2005 | Baker |
| 2004/0060605 | A1 | | 4/2004 | Jhurani |
| 2005/0082501 | A1 | | 4/2005 | Chen |
| 2007/0262277 | A1 | | 11/2007 | Williams et al. |
| 2010/0102261 | A1 | | 4/2010 | Yuan |
| 2011/0140015 | A1 | | 6/2011 | Parsons et al. |

FOREIGN PATENT DOCUMENTS

| | | |
|---|---|---|
| CN | 202597783 | 12/2012 |
| DE | 1202085 | 9/1965 |
| EP | 0374493 | 6/1990 |
| EP | 0401072 | 12/1990 |
| WO | 2004/068027 | 8/2004 |

\* cited by examiner

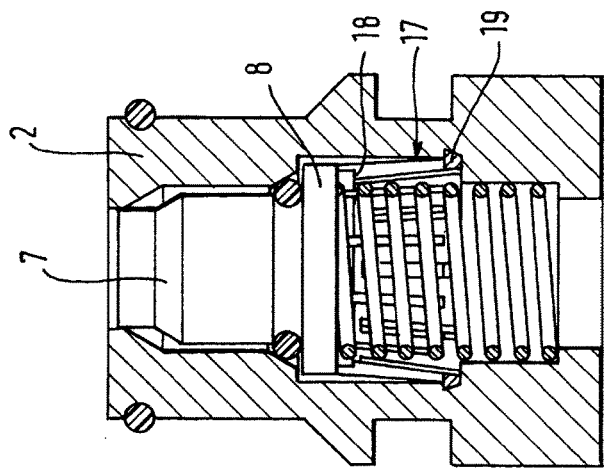
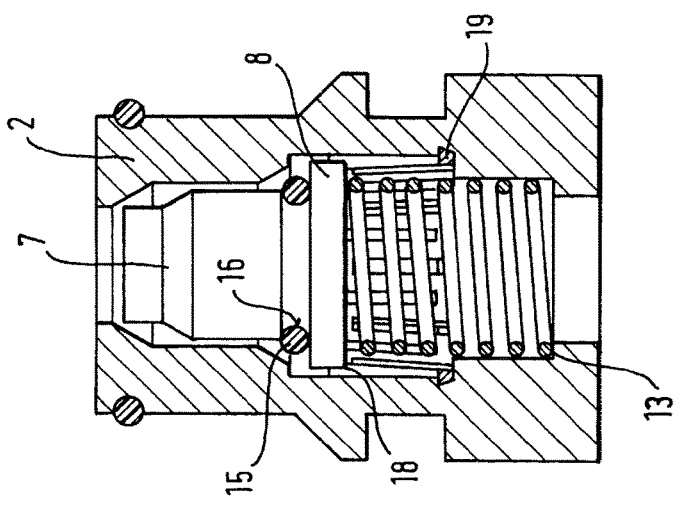
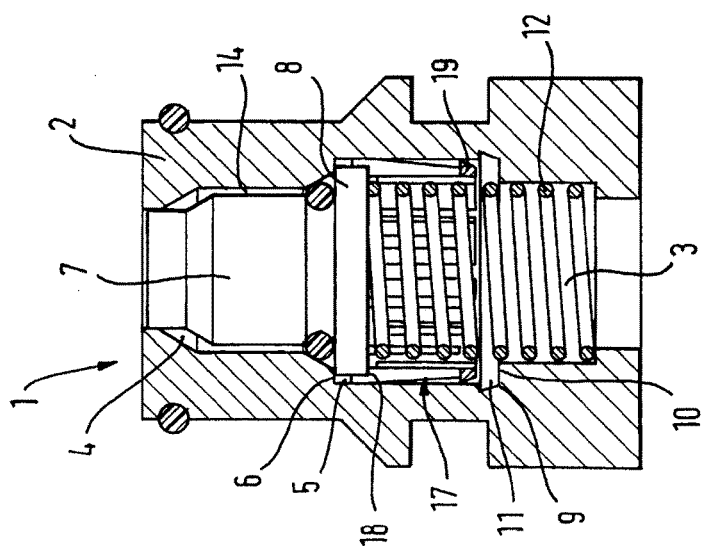

SINGLE USE VALVES

CROSS-REFERENCE TO RELATED APPLICATIONS

The present application is a U.S. National Stage of International Application No. PCT/EP2013/060945 filed May 28, 2013, which published as WO 2014/161608 A1 on Oct. 9, 2014, the disclosure of which is expressly incorporated by reference herein in its entirety. Further, this application claims the benefit of U.S. Provisional Application No. 61/808,950 filed Apr. 5, 2013, and claims the benefit of U.S. Provisional Application No. 61/808,058 filed Apr. 4, 2013, the disclosures of which are expressly incorporated by reference herein in their entireties.

BACKGROUND OF THE DISCLOSURE

1. Field of the Disclosure

The present disclosure relates to the technical field of single use valves. Such valves are used, for example, mounted on a connector for allowing only one fluid or gas filling or extraction operation of a container through the connector and preventing any subsequent refilling operation or re-extraction operation.

2. Background Description

Non-refillable valves are well known (see, for example, US 2005/0082501 A1, US 2004/0060605 A1, U.S. Pat. No. 4,573,611 or WO 2004/068027 A1) to permit a single filling of a pressurized container and prevent subsequent refilling of the container. However, these valves are generally not adapted for preventing fluid extraction from the filled container.

Single use diaphragm valves are also known, particularly in the biotechnology industry (see, for example US 2007/0262277 A1), but necessitate a complicated connection bloc to be mounted on a main connector in order to allow for a diaphragm disposed in the valve body to be deformed so as to close the flow passage.

It would be desirable to prevent unauthorized extraction and refilling of the valuable fluid and/or provide an indication of such unauthorized use.

SUMMARY OF THE DISCLOSURE

The present disclosure provides single use valves that avoid the above mentioned drawbacks of the prior art.

A single use valve according to one aspect of the disclosure allows only one fluid or gas or powder filling operation of a container and prevents any subsequent refilling operation. In another aspect of the disclosure, a single use valve is configured to allow only one fluid extraction operation and prevent any subsequent fluid extraction operation. In embodiments, valve closers are provided to close the valve to prevent refilling and extraction operations after a first extraction or filling operation.

In an embodiment, the single use valve is mounted or mountable on a container already filled with a fluid or a gas or a powder, and allows only one fluid or gas extraction operation and prevents any subsequent refill and extraction operations on the container.

Such a single use valve makes it possible to determine if an unauthorized extraction, e.g. during delivery, of the fluid has taken place, since a closed valve is indicative of an extraction operation having already taken place. Also, the inability of the valve to serve as a filling inlet after an extraction operation results in there being no possibility for the valve to be used for the filling of unauthorized, perhaps inferior quality, fluids.

In an embodiment, the disclosure also concerns a connector (or tube or pipe) equipped with such a single use valve.

An aspect of the disclosure further relates to a filled or substantially filled tank equipped with a connector including said single use valve for single use operation, configured such that after completion of an initial filling/extraction operation on the tank, it is neither possible to refill the tank nor further extract a residual content of the tank through said valve of the connector. Moreover, by allowing only a single use operation regarding filing and/or extraction through it, the single use valve according to the disclosure is in fact a tamperproof single use valve.

In another aspect of the disclosure (which may be combined with the above aspects and embodiment), a single use valve is provided having a valve member in a closed position that sealingly closes the valve such that fluid is not able to pass through the valve, the valve member is moveable to an open position to allow fluid to pass through the valve, the valve is configured to go into a permanently closed state that prevents the passage of fluid through the valve (in both a fluid in and a fluid out direction) after a single opening of the valve member.

In another aspect (which may be combined with the above aspects and embodiments), the present disclosure provides a single use valve having a valve member moveable from a closed position that sealingly closes the valve such that fluid is not able to pass through the valve, to an open position to allow fluid to pass through the valve, characterized by comprising a locking member arranged to move with the valve member moving to the open position to be placed in a locked position to allow for blocking the valve member after the valve member has moved back from the open position to the closed position, thereby configuring the valve into a permanently closed state that prevents the passage of fluid through the valve after a single motion of the valve member from the open position to the closed position.

The locking member itself may be configured to block movement of the valve member from the closed position when the locking member is in the locked position, or the movement of the locking member to the locked position may release a component to move into a blocking position. Either way, it is movement of the blocking member into the locked position that allows for release of a blocking component to prevent movement of the valve member from the closed position to thereby place the valve in a permanently closed state.

The single use valve of the present disclosure is placed into a permanently closed state after just a single use such that the valve prevents passage of fluid in both directions through the valve. In this way, it can be irreversibly shown by the permanently closed state whether an unauthorised extraction or filling operation is performed. This will provide a deterrent to such acts. Also, after an extraction operation, a subsequent filling operation is not possible, thereby preventing a container or tank from being extracted from and filled with replacement fluid, perhaps of inferior quality. The single use valve can thus also provide assurance that the fluid in the container is according to the supplier's specification.

In an embodiment, the valve member is permanently locked in the closed position after a single opening thereof to place the valve in the permanently closed state. In this way, the valve member is irreversibly placed in the closed position to provide an easy to ascertain indication of whether the valve has been used and to prevent subsequent use. The locked and closed position of the valve member can be checked in order to indicate that the valve has not been tampered with. Locking of the valve member also prevents the closed state of the valve from being circumvented by manipulating the valve member.

In an embodiment, the valve comprises a housing defining a bore therethrough, and the valve member is moveable axially within the bore between the closed position in which a fluid passage through the bore is closed and the open position in which the fluid passage is open. The valve member may be mechanically moved from the closed position to the open position by contact with an external valve connector. In an embodiment, the valve is configured so that the valve member is immovably locked in the closed position so that the valve member is not able to be moved within the bore after the valve member has returned to the closed position from the open position, to thereby define the permanently closed state of the valve.

In an embodiment, the valve member is biased to return to the closed position from the open position.

In an embodiment, the valve member is configured to be moved from the closed position to the open position by an external valve connector displacing the valve member. The valve member is configured to be moved under a biasing member in the valve from the open position to the closed position when the external connector is removed.

In an embodiment, the valve is configured so that the opening and/or the closing movement of the valve member causes the permanently closed state to be activated.

In an embodiment, the valve comprises a locking member that is moveable to a locking position by interaction with movement of the valve member from the closed position to the open position. In particular, the locking member is arranged to move with the valve member moving to the open position to place the locking member in the locked position. In an embodiment, the locking member is engaged with the valve member so that the locking member moves to the locking position as the valve member moves to the open position.

In an embodiment, the valve is configured so that the valve member is blocked in the closed position after moving back to the closed position from the open position.

In an embodiment, a blocking member is arranged to spring or otherwise move into a blocking position by way of interaction with movement of the valve member between the open and closed positions to place the valve in the permanently closed state. In particular, the blocking position of the blocking member prevents movement of the valve member from the closed position, thereby defining the permanently closed state of the valve.

Put another way, the valve comprises holders in the form of one part associated with the locking member and another part associated with a valve housing, such that the one part and the other part are configured to spring into engagement with one another when they move into alignment when the locking member is moved into the locking position and moved relative to the valve housing. The one part and the other part may be configured to spring into engagement. The one part and the other part may be provided as a cooperating protrusion and recess. The protrusion may be provided as a moveable bolt, a flange, or a tooth.

The valve may also comprise blockers in the form of one part associated with the locking member and one part associated with the valve member, such that the one part and the other part are configured to spring into engagement with one another when they move into alignment when the valve member moves to the closed position and moves relative to the locking member that is held in the locking position by the holders. The one part and the other part may be provided as a cooperating protrusion and recess. The protrusion may be provided as a moveable bolt, a flange, or a tooth.

In an embodiment, the locking member and the valve member cooperate such that once the locking member is moved to the locking position and the valve member is in the closed position, the blocking member is released to spring to the blocking position, thereby placing the valve in the permanently closed state.

In an embodiment, the locking member is configured to move with the valve member from an initial position to a locking position. The valve includes holders to hold the locking member in the locking position. The holders may be provided as a cooperating projection and recess. More generally, the holders may be configured to spring into a holding state to lock the locking member in the locking position. In an embodiment, the holders comprises a recess and spring loaded finger. In an embodiment, the holders may be provided radially between the locking member and an outer housing defining a bore in which the valve member and the locking member move axially between the open and closed positions of the valve member and the initial and locking positions of the locking member.

In an embodiment, the locking member and the valve member are held fixed to one another and are arranged to move together as the valve member moves from the closed position to the open position, thereby moving the valve member from the initial position to the locking position. In returning to the closed position from the open position, the valve member is able to move relative to the locking member as the locking member remains held in the locking position by the holders.

The valve may include at least one blocking surface or blocking member for preventing movement of the valve member to define the permanently closed position, wherein the at least one blocking surface or blocking member is configured to be in a blocking position when the valve member has returned to the closed position from the open position and when the locking member is held in the locking position. The at least one blocking surface or blocking member may comprise cooperating blocking parts between the valve member and the locking member. In particular, the at least one blocking surface or blocking member includes a part of the locking member that is engaged by a part of the valve member when the valve member has returned to the closed position and thus moved relative to the locking member. The blocking surface or blocking member may spring into a blocking position as the valve member moves past the blocking surface or blocking member in moving to the closed position from the open position. In an embodiment, the blocking surface or blocking member may be provided to include a finger that springs into engagement with a recess.

In an embodiment, the locking member is disposed radially around the valve member when the locking member is in the initial position and the valve member is in the closed position. The blocking surface or blocking member may be disposed radially between the valve member and the locking member.

In an embodiment, the valve includes a plurality of blocking surfaces or blocking members to prevent the valve member from moving back toward an open position after the valve member has moved from the open position toward the closed position. In particular, blocking surfaces or members are located progressively closer to the closed position of the valve member. The blocking surfaces or members may cooperate with at least one cooperating blocking surface or member of the valve member. This feature of the present disclosure allows the closed position to be defined with manufacturing tolerance included. It also ensures that once the valve member has started to move from the open position to the closed position that there is no way of reversing this movement.

The plurality of blocking surfaces may be provided in the form of adjacent recess and protrusions spaced in the direction of the valve member moving from the open to the closed position. The plurality of blocking surfaces may be provided in the form of teeth spaced apart in the direction of the valve member moving from the open to the closed position.

In an embodiment, the valve member includes at least one cooperating blocking surface arranged to engage with the plurality of blocking surfaces to prevent movement of the valve member toward the open position. In an embodiment, at least one of the at least one cooperating blocking surface of the valve member and the plurality of blocking surfaces spring into a blocking position as the valve member moves from the open position to the closed position.

In an embodiment, the plurality of blocking surfaces is provided on the locking member.

In an embodiment, the valve comprises a plurality of holding surfaces spaced apart in the direction of movement from the initial position to the locked position of the locking member. The plurality of holding surfaces serve to hold the locking member in a plurality of respective positions toward the locking position to prevent the locking member moving in the direction from the locked position to the initial position, thereby allowing the valve member to move relative to the locking member in the direction from the open position to the closed position as the locking member remains held by the holders.

Thus, in an embodiment, the valve comprises a locking member that is engaged with the valve member in the closed position of the valve member and in an initial position of the locking member. The valve member is moveable to the open position by actuation from an external valve connector. The locking member is moveable with the valve member to a locking position at which the locking member is held by a holder or member, such that when the valve member returns to the closed position by spring bias, the valve member moves relative to the held locking member. The locking member and the valve member include a blocking member between them, which deploys when the valve member has returned to the closed position and the locking member is in the locked position to prevent the valve member from moving out of the closed position. The locking member may be provided as a hollow cylinder or ring that is disposed radially around and outer periphery of the valve member, at least in the closed position of the valve member and the initial position of the locking member.

In an embodiment, the valve comprises a valve housing defining a bore therethrough. The valve member is moveable within the bore and relative to the valve housing from the closed position to the open position.

In an embodiment, the valve comprises a sealer, such as a sealing ring, that is disposed to seal the passage closed when the valve member is in the closed position. In an embodiment, the sealer is carried on the valve member. In particular, the valve member comprises a ledge and optionally a recess, with the sealer disposed on the ledge and in the recess. The sealer is compressed between the ledge and a cooperating part of the above mentioned housing when the valve member is in the closed position.

In an embodiment, the valve comprises a shoulder or other spring support in the bore that supports a spring that biases the valve member in the direction of movement from the open position to the closed position.

In an embodiment, the locking member is provided as a locking hollow cylinder or ring disposed at least partly about the valve member.

In an embodiment, an outer peripheral portion of the valve member engages an inner peripheral portion of the locking cylinder such that they move together as the valve member moves from the closed position to the open position.

In an embodiment, a holding part is configured to spring radially inward or outward to engage a recess to hold the locking member in position once the locking member has moved to the locking position to allow the valve member to move relative to the locking member as the valve member moves from the open position to the closed position. One of the holding part or recess is disposed in the housing, and the other thereof is disposed in the locking member that moves relative to the housing.

In an embodiment, a blocking part is configured to spring radially inward or outward to engage a recess to block movement of the valve member relative to the locking member. One of the blocking part or recess is disposed in the valve member and the other thereof is disposed in the locking member, so that when the locking member is held in the locking position, the one blocking part or recess moves relative to the other as the valve member moves from the open position to the closed position.

In embodiments, the valve member is accessible from one side of the housing to allow it to be moved, e.g. by an external valve connector, to the open position.

In an embodiment, the valve comprises a second valve member. The second valve member is moveable between an open position and a closed position. In the open position, the second valve member allows fluid to pass through the passage. In the closed position, the passage is closed to fluid passing through the valve. In an embodiment, the previously discussed valve member, the first valve member, and the second valve member cooperate so that movement of one toward the open position is transmitted to movement of the other to the open position. In particular, the first valve member may comprise a tail portion that pushes on the second valve member to open the second valve member. The second valve member is biased to move from the open position to the closed position. The provision of a second valve member provides improved fluid drip resistance.

In an embodiment, the valve member is fastened to a biasing member resting on a shoulder or other support of a housing of the valve. The valve member is operable to move axially in the valve housing between the closed position in which the valve is closed, i.e. prevents any flow through the passage in the valve housing, and the open position in which the valve is open, i.e. allows flowing through the passage. The valve member is operable, when moving from the closed to the open position, to simultaneously axially move a peripheral one-way blocking member within the passage up to a position in which said blocking member radially engages with a peripheral element fixed on the inner side of the housing and then cannot further move axially. The valve member is further operable to axially move back from the open position to the closed position with the one-way blocking member remaining in the position at which the one-way blocking member is then operable to prevent any subsequent axial motion of the valve member, so that the valve then remains closed.

In another embodiment, the valve member has an outer peripheral saw-tooth profile base portion comprising at least one tooth. The valve member is fastened to a biasing member resting on a shoulder or other support of a housing of the valve. The valve member is operable to move axially in the valve housing between the closed position in which the valve is closed, i.e. prevents any flow through the passage in the valve housing, and the open position in which the valve is open, i.e. allows flowing through the passage. The valve member is operable, when moving from the closed position to the open position, to simultaneously axially drive a peripheral double rack member having an inner saw-tooth profile comprising at least one tooth and an outer saw-tooth profile comprising at least one tooth within the passage up to a position in which said double rack member radially engages with a peripheral saw-tooth profile comprising at least one tooth fixed on the inner side of the housing and then cannot further move axially. In an embodiment, the valve member engages said double rack member inner saw-tooth profile by its outer peripheral saw-tooth profile. The valve member is further operable to axially move back from the open position, the double rack member remaining in said position, up to the closed position at which the double rack member is then operable to prevent any subsequent axial motion of the valve member, so that the valve then remains closed.

The present disclosure further contemplates a filled or substantially filled ink or other fluid tank or container comprising a single use valve (which may be a single use valve defined according to any of the embodiments and aspects given above). The ink tank may be filled or substantially filled with security ink. The single use valve is provided for the purpose of extracting the fluid or security ink from the ink tank. The single use valve is provided in a closed state that is able to be moved once to an open state for extracting the fluid or security ink and thereafter is biased to return to a permanently closed state in which the valve is prevented from returning to an open state so as to prevent passage of fluid in any direction through the valve. The tank may comprise a second single use valve that is provided for the purpose of filling that tank and which is already placed in the permanently closed state as it has been used to fill or substantially fill the tank. So, the tank cannot be refilled since the fill valve is permanently closed and the tank can be emptied or partly emptied in a single extraction operation through the single valve. The single use extraction valve may be the only extraction valve provided in the tank.

In another aspect, the present disclosure provides a use of a single-use valve comprising extracting security ink from an ink tank through the single use valve, wherein after the extraction operation, which is a first extraction operation for the single use valve, the single use valve is placed into a permanently closed state to prevent further extraction operations.

In another aspect, the present disclosure provides for a method of producing a filled or substantially filled ink tank, comprising filling or substantially filling the ink tank with security ink, wherein the filling is performed through a first single use valve that permanently closes after the filling operation to prevent any further filling operations through the first valve and to prevent any extraction operation through the first valve and/or wherein the ink tank is fitted with a second single use valve that is in a closed state and that is able to be placed into an open state just once to allow an extraction operation and is biased to return to a permanently closed state that prevents any further extraction operation through the second valve and that prevents a refilling operation through the second valve.

In a further aspect of the present disclosure, a single use valve comprises a valve housing defining a bore therethrough, a valve member moveable in the bore relative to the valve housing from a closed position that sealingly closes the valve such that fluid is not able to pass through the valve, to an open position to allow fluid to pass through the valve, wherein the valve further comprises: a locking member arranged to move with the valve member moving to the open position to be placeable in a locked position, which blocks the valve member after the valve member has moved back from the open position to the closed position, thereby configuring the valve into a permanently closed state, thus preventing the passage of fluid through the valve after a single motion of the valve member from the open position to the closed position, wherein the valve is configured so that the valve member is immovably locked in the closed position so that the valve member is not able to be moved within the bore after the valve member has returned to the closed position from the open position, to thereby define the permanently closed state of the valve.

In yet a further aspect of the present disclosure, the valve further comprises a blocking arrangement structured to block the valve member in the closed position after moving from the open position to the closed position to place the valve in the permanently closed state.

In an additional aspect of the present disclosure, movement of the valve member from the open position to the closed position releases the blocking member from a strained state to spring into the blocking position.

In certain embodiments of the present disclosure, the locking member is cooperatively moveable with the valve member from an initial position to a locking position, and the valve includes at least one holder structured and arranged to hold the locking member in the locking position.

In yet a further aspect of the present disclosure, the at least one holder is provided as at least one cooperating projection and recess.

In an additional aspect of the present disclosure, the at least one holder is structured and arranged for holding the locking member in the locking position so that the valve member is moveable relative to the locking member as the valve member moves from the open position to the closed position.

In certain embodiments of the present disclosure, the plurality of blocking surfaces comprise adjacent sets of a recess and a protrusion spaced in the direction of the valve member moving from the open to the closed position.

In yet a further aspect of the present disclosure, the plurality of blocking surfaces are structured and arranged to allow the valve member to move by rubbing there past from the open to the closed position, but to prevent movement from the closed to the open position.

In certain embodiments of the present disclosure, the valve further comprises a sealer that is disposed to seal the passage closed when the valve member is in the closed position.

In at least some embodiments of the present disclosure, the sealer is carried on the valve member so as to be compressed between the valve member and a cooperating part of the housing when the valve member is in the closed position.

In an additional aspect of the present disclosure, the valve further comprises: a spring that biases the valve member in the direction of movement from the open position to the closed position; and a shoulder or other spring support in the passage that supports the spring.

In certain embodiments of the present disclosure, the locking member comprises a locking hollow cylinder disposed at least partly about the valve member.

In yet a further aspect of the present disclosure, an outer peripheral portion of the valve member engages an inner peripheral portion of the locking cylinder such that the valve member and the locking cylinder move together as the valve member moves from the closed position to the open position.

In certain embodiments of the present disclosure, the first valve member and the second valve member cooperate so that movement of one of the first valve member and the second valve member toward the open position is transmitted to movement of the other of the first valve member and the second valve member.

Additional aspects of the present disclosure are directed to a method for using a single use valve to extract fluid from an ink tank, the method comprising: extracting fluid from a tank through the single use valve; and placing the single use valve into a permanently closed state to prevent further extraction operations.

Further aspects of the present disclosure are directed to a method for using a single-use valve comprising: extracting security ink from an ink tank through the single use valve in an extraction operation; and after the extraction operation, which is a first extraction operation for the single use valve, placing the single use valve into a permanently closed state to prevent further extraction operations.

In certain embodiments of the present disclosure, the sealer comprises a sealing ring.

In at least some embodiments of the present disclosure, the fluid comprises security ink.

BRIEF DESCRIPTION OF THE DRAWINGS

The present disclosure will be described more fully hereinafter with reference to the accompanying drawings in which like numerals represent like elements throughout the different figures, and in which prominent aspects and features of the disclosure are illustrated.

FIG. 1 illustrates a sectional view of a single use valve according to an embodiment of the disclosure in an initial closed position.

FIG. 2 illustrates a sectional view of the single use valve of FIG. 1 in an open position.

FIG. 3 illustrates a sectional view of the single use valve of FIGS. 1 and 2 in a blocked position.

FIG. 9 shows the first and second valve members in the closed position.

FIG. 12 shows the valve in the closed position.

DETAILED DESCRIPTION OF EMBODIMENTS OF THE DISCLOSURE

Figure 4:
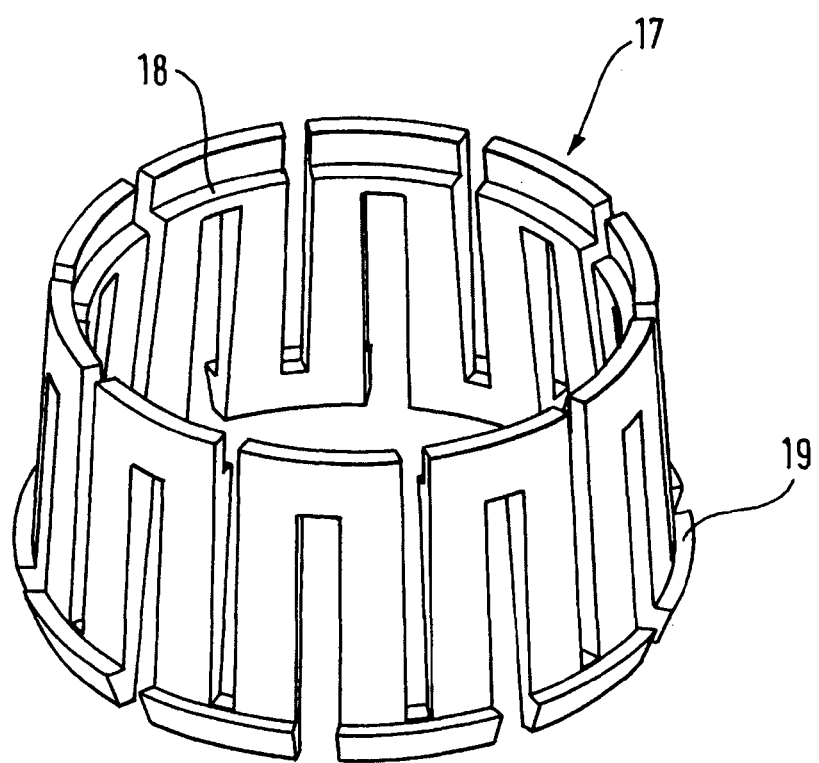
FIG. 4 illustrates a perspective view of the clip member of a single use valve of FIGS. 1 to 3.

Firstly, there will be described a general overview of the single use valve of FIGS. 1 to 14, before going on to describe these embodiments in more detail.

In the embodiments of FIGS. 1 to 14, there is shown a valve (1) comprising a valve housing (2) defining a bore (3) therethrough. The bore (3) accommodates a valve member (7) that is axially moveable with respect to the valve housing (2) between an initial closed position (FIGS. 1, 5 and 12) in which a fluid passage (14) through the valve (1) is closed to prevent fluid passing in or out of the valve (1) and an open position (FIGS. 2, 6 and 13) in which the passage (14) is open to allow fluid to pass through the valve (1) in at least one of an inlet and an outlet direction. The valve (1) is such that the valve member (7) can be mechanically actuated when it is in the closed position to move to the open position by way of an external valve connector (not shown).

The valve (1) is configured so that the passage (14) can only be opened once. In particular, when the valve member (7) is returned to a closed position from the open position, a blocker permanently closes the valve (1) by blocking movement of the valve (7) when it is in the returned closed position from moving back in the direction toward opening of the passage (14).

In one implementation the valve (1) is configured to provide the blocker by way of cooperating blocking surfaces (8, 17, 13, 17b, 46, 47) that move into a blocking arrangement preventing opening movement of the valve member (7) as a result of interaction with movement of the valve member (7) in returning to the closed position. The cooperating blocking surfaces (8, 17, 17b, 13, 46, 47) may make use of material resiliency to move into a blocking arrangement.

In the particular implementation shown in FIGS. 1 to 4, the blocker is provided by a locking member (17) that allows the valve member (7) to move from the open position to return to the closed position to provide clearance for the locking member (17) to spring into a blocking configuration (FIG. 3) in which a path for the valve member (7) from the closed state to return to the open position is blocked, thereby permanently closing the valve (1). In one form, the locking member (17) moves from a radially expanded state (FIG. 2) to a radially contracted state (FIG. 3).

In another implementation as shown in FIGS. 5 to 8, the blocker is provided by at least one tooth (17b) that allows the valve member (7) to pass in the direction of the open position to return to the closed position, but blocks movement of the valve member (7) from moving back toward the open position from the closed position, thereby permanently closing the valve (1). The at least one tooth (17b) may thus be sloped on one side to allow the valve member (7) to move from the open position to return to the closed position, and be relatively flat on the other side to provide for the blocking function. Again, cooperating blocking surfaces (17b, 13) will be provided between the valve member (7) and the housing (2) that includes the at least one tooth (17b) and the passing of the valve member (7) with respect to the tooth (17b) will rely on the materials resiliently deforming to pass thereover in moving from the open position to the closed position. In the particular embodiment shown in FIGS. 5 to 8, the at least one tooth is provided as a plurality of teeth (17b), thereby providing a plurality of blocking surfaces preventing the valve member (7) from moving in the opening direction that are progressively engaged as the valve member (7) moves from the open position in the direction of the closed position.

Figure 12:
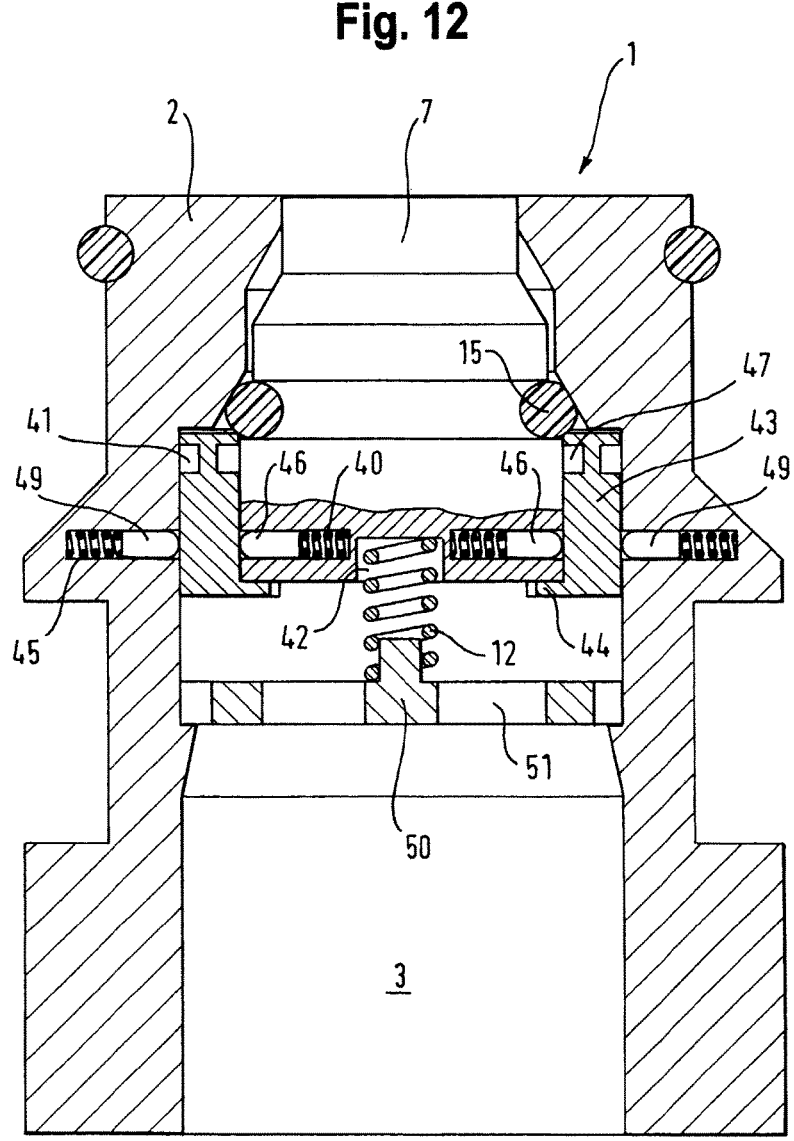
FIG. 12 discloses another embodiment of a valve according to the present disclosure.
Figure 13:
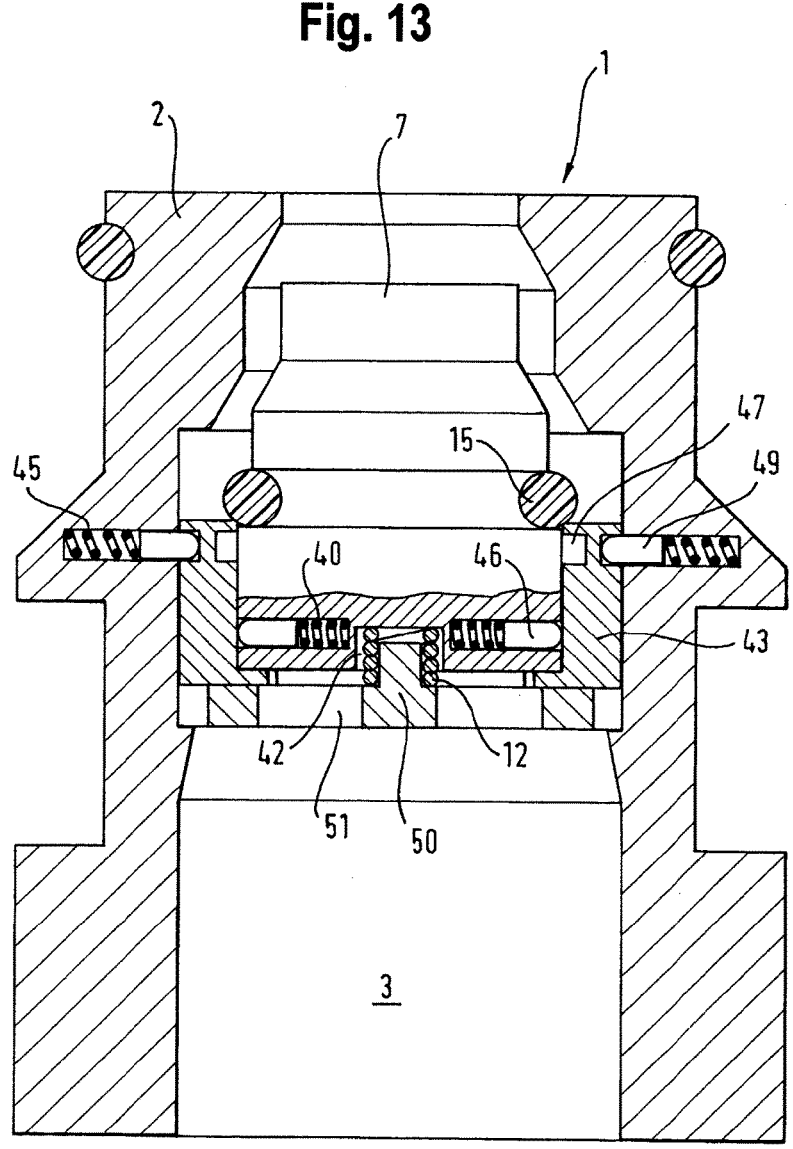
FIG. 13 shows the valve of FIG. 12 in which the valve member has been moved to the open position, and an associated locking member has been moved into a locking position and engaged by an automatically deploying bolt to hold the locking member fixed relative to the housing.
Figure 14:
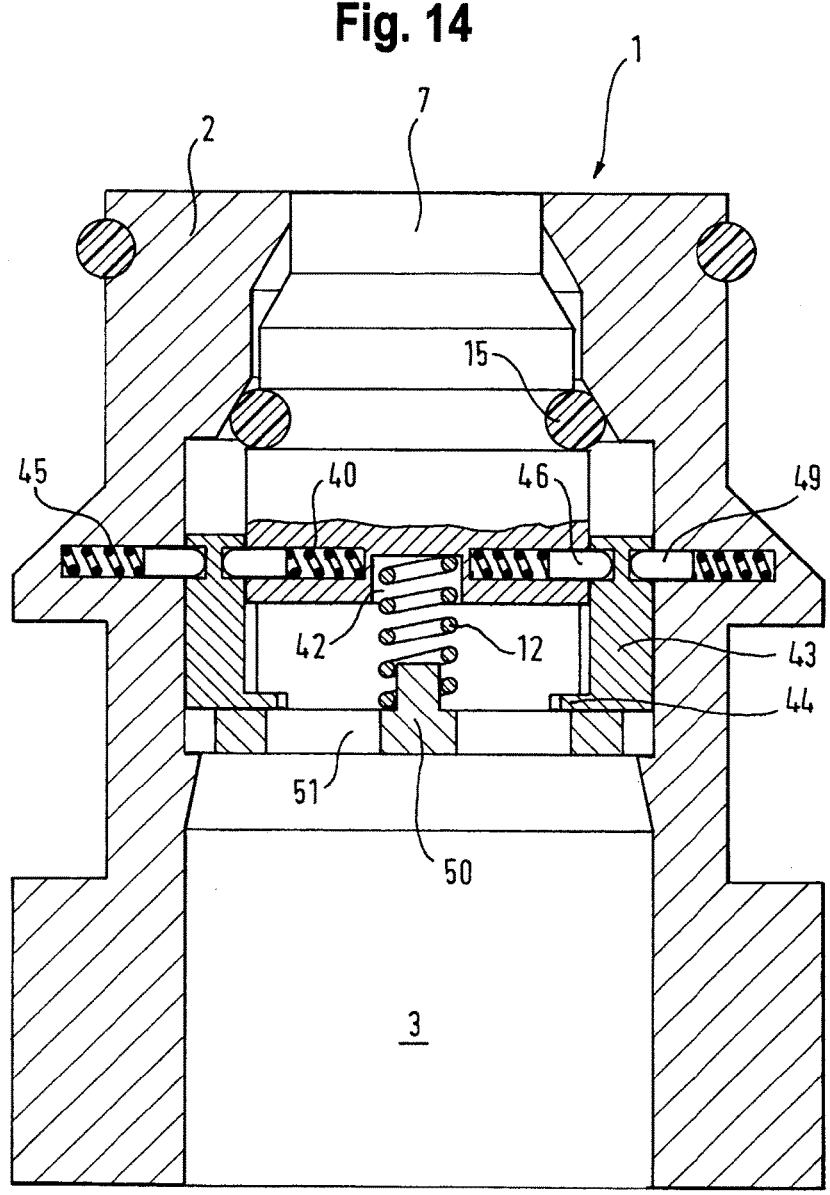
FIG. 14 discloses the valve of FIGS. 12 and 13 in the permanently closed position in which the valve member has returned from the open position to the closed position and a second bolt has deployed to engage a recess in the locking member to block movement of the valve member out of the closed position.

In another variation as shown in FIGS. 12 to 14, the blocker is provided by way of at least one cooperating bolt and recess, wherein the bolt springs into the recess when they align as the valve member moves into the closed position from the open position.

In the above-described embodiments, in order for the blocker to move into a blocking position or arrangement, the valve member (7) may be required to move relative thereto as the valve member (7) moves from the open position to return to the closed position. A solution for achieving this has been found to be to provide a locking member (17, 27, 43) that moves with opening of the valve member (7) from the closed position to the open position and is then held fixed relative to the valve housing (2) by some form of holders (11a, 17a, 11, 19, 41, 49), preferably a projection and recess arrangement, so that the valve member (7) is able to move relative to the locking member (17, 27, 43) in the direction of movement from the open position to return to the closed position to allow for the blocker to move or otherwise come into effect. The valve member (7) is moveable from the open position to return to the closed position under a biasing member (12) upon release of mechanical action from the external valve connector.

Figure 8:
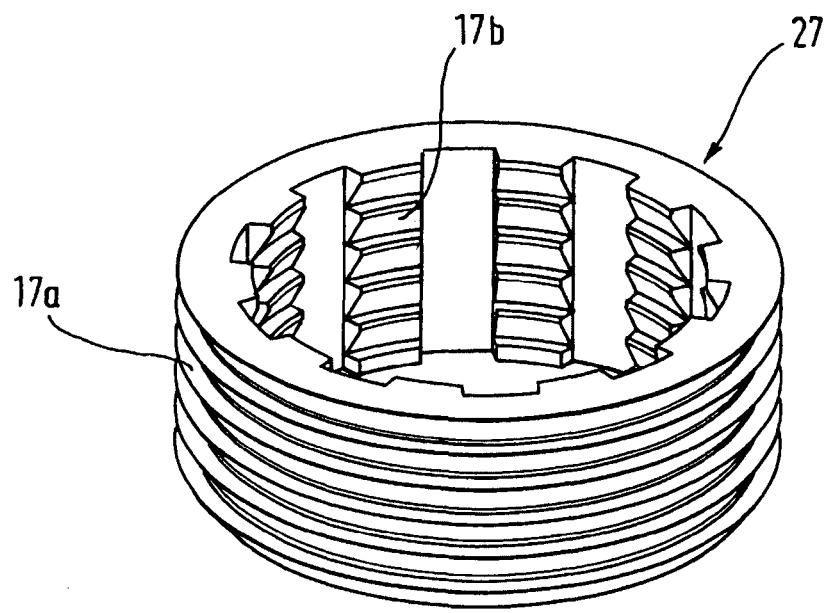
FIG. 8 illustrates a perspective view of one-way blocking member of the single use valve of FIGS. 5 to 7.
Figure 9:
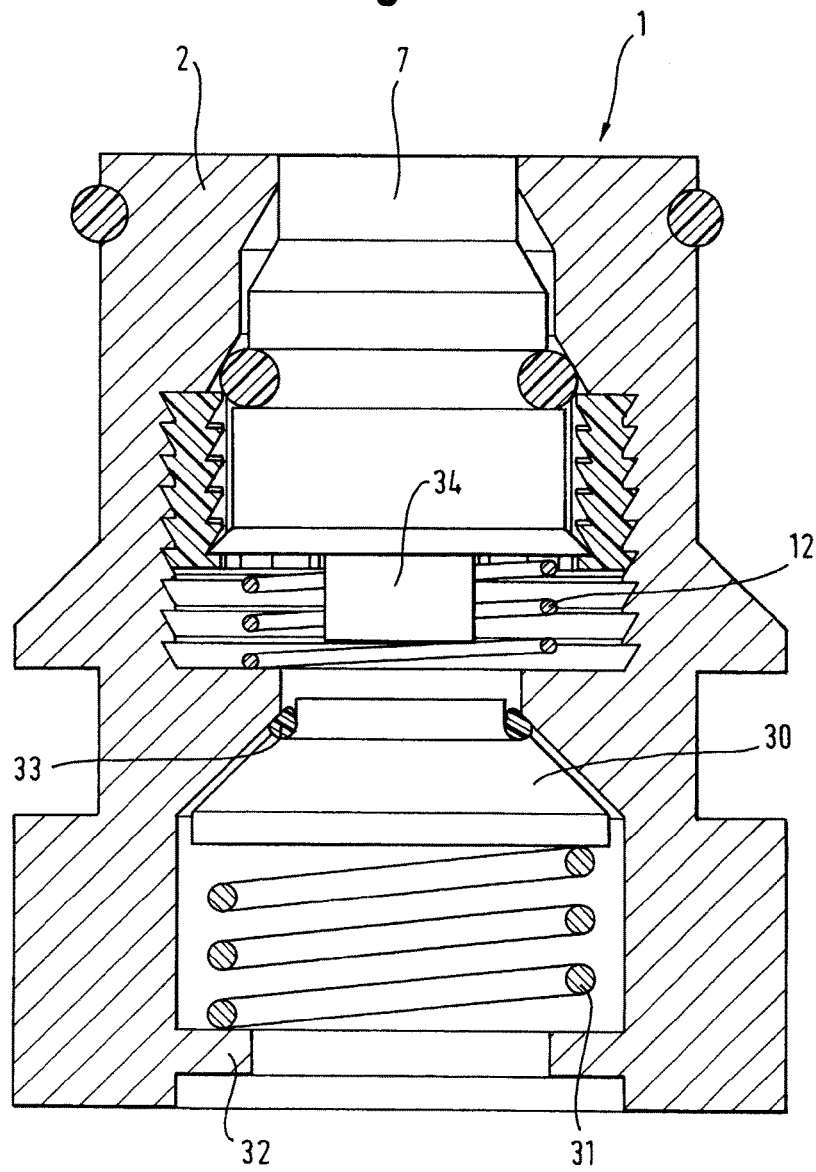
FIG. 9 illustrates a modification of the embodiment of FIGS. 5 to 8 in which a further, second valve member is included in the passage defined by the valve housing.
Figure 10:
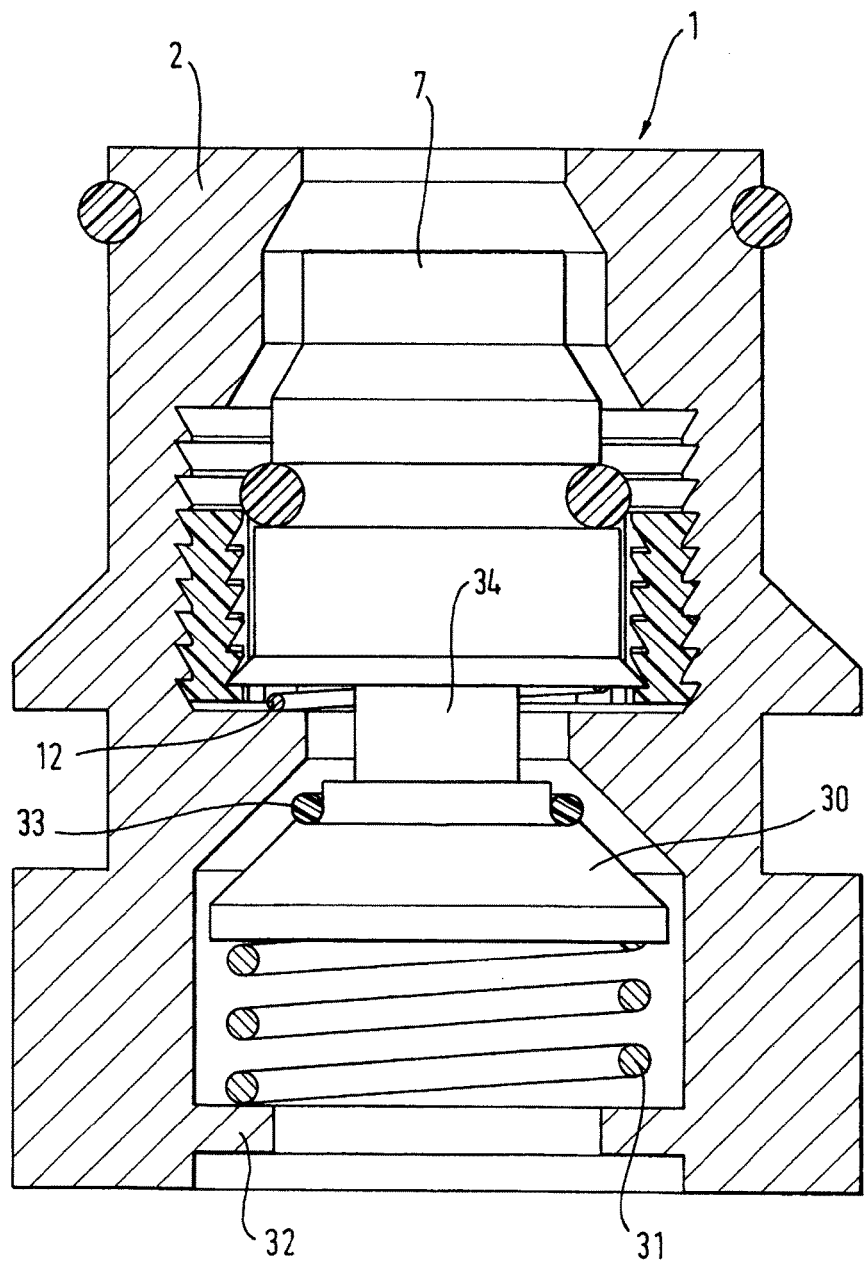
FIG. 10 shows the first valve member moved to an open position such that a tail portion of the first valve member has contacted and pushed open the second valve member, thereby defining an open state of the valve.
Figure 11:
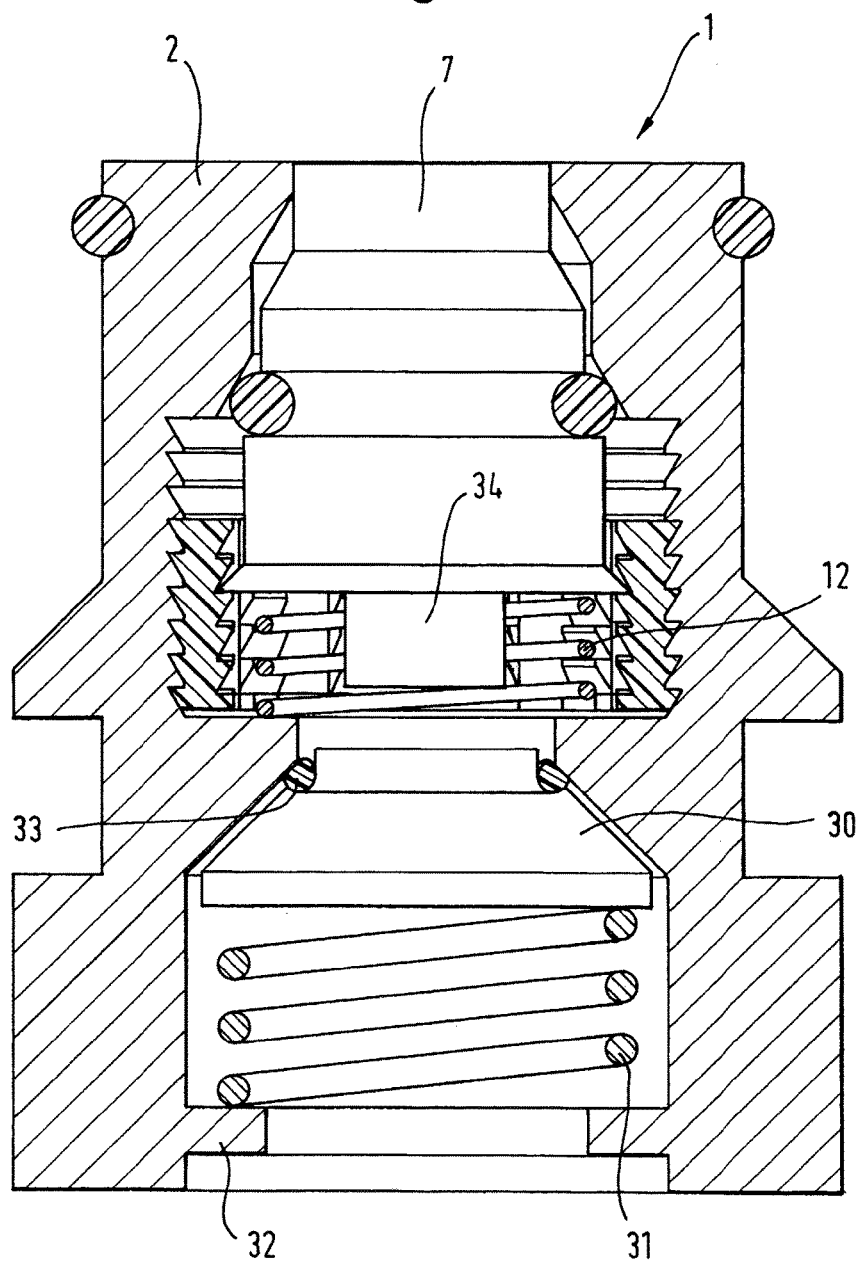
FIG. 11 shows a permanently closed state of the valve in which the first valve member is blocked in the closed position and the second valve member has returned under spring bias to its closed position.

In FIGS. 9 to 11, an alternative embodiment is shown in which a second valve member (30) is provided that is arranged in the axial bore (3) through the valve housing and which also serves to close the valve. The second valve member (30) is located behind the first valve member (7) in a direction of movement of the first valve from the closed position to the open position when actuated by the external valve connector. The second valve member (30) is acted upon by the first valve member (7) when the first valve member (7) is moved into the open position to move the second valve member (30) into the open position, while when the first valve member (7) is in the initial closed position or is returned to the closed position, the second valve member (30) is free to return to its own closed position under biasing of a biasing member (12). The modification of FIGS. 9 to 11 is shown applied to the embodiment of FIGS. 5 to 8, but such a second valve member (30) can equally be applied in the bore (4) of the housing (2) of the embodiments of FIG. 1 to 4 or 12 to 14), arranged in the same order and acted upon by the first valve member (7) in the same way.

An embodiment of a single use valve (1) according to the disclosure is illustrated in FIG. 1. The single use valve device (1) includes a housing (2) having a central cavity (3) extending axially within the housing portion between its longitudinal ends and receiving and retaining valve components as described below.

The valve housing and/or valve components may be made of any conventional material (e.g., plastics and/or polymers, metal) that meet valve specifications for a particular application. Any type or types of fluids (e.g., liquid, gas or powder) may be utilized with the valve device.

Central cavity (3) includes an upper (or first) cavity section (4) extending from the valve housetop surface to an intermediate (or second) cavity section (5). A base end of the upper cavity section has a radially extending first shoulder (6).

A valve core (7) (valve member) is operable to move axially within the upper and intermediate cavity sections (see also FIGS. 2 and 3) and has a base portion of extended diameter which is operable to move axially only within the intermediate cavity section (5), as being stopped by the first shoulder (6) when moving upward in direction of the upper cavity section. A base end of the intermediate cavity section has a radially extending shoulder defining a rim portion (10) and having at a peripheral part a notch (11).

A biasing member (12) is provided (illustrated by a coil spring in the figures) between the base portion (8) of the valve core (7) and a radially extending shoulder (13) of the housing (2). In a variant of the disclosure, this shoulder (13) in fact corresponds to the rim portion (10) (which then extends sufficiently inward so as to further bear the applied load due to the biasing member (12)).

The base end portion (8) of the valve core (7), when pressed against the first shoulder (6) by the biasing member (12), closes a passageway (14) and prevents any flow in any direction between the upper cavity section (4) and the intermediate cavity section (5). The valve device (1) may further include a resilient sealing member (15), for example, of the type of an O-ring provided within a groove (16) extending around an outer peripheral section of the valve core (7). This sealing member (15) ensures that a fluid tight seal is maintained at the interface between the valve core lower portion and the intermediate cavity section (5).

An annular double clip member (17), made of a resilient elastic material (e.g., plastics, metal), is slidingly engaged in the intermediate cavity section (5). This clip member (17) has an annular top end (toward the base portion (8) of the valve core (7)) with a radially extending top shoulder (18) allowing said top end to be engaged with the base portion (8) of the valve core (7) and elastically pressed on a peripheral face the base portion, as illustrated on FIG. 1, when the valve device is in its initial closed position. The clip member (17) has a base end with a radially extending flange (19), as illustrated in FIG. 4. The axial height of the clip member is shorter than the axial height of the intermediate cavity section (5), so that, in case the annular top end of the clip member is engaged with the base portion (8) of the valve core (7), the flange (19) is above the notch (11) and cannot engage with it.

As illustrated in FIG. 2, when the valve core (7) is axially moved downward, under external mechanical action exerted on its top part, thus opening the passageway (14), and allowing flow between the upper cavity section (4) and the intermediate cavity section (5), the clip member (17) is pushed downward (due to the valve core pressing on the top shoulder (18)) and moves axially within the intermediate cavity section (5) until the axially slidingly moving flange (19) radially engages with the notch (11), the clip member being then stopped by the rim portion (10) at the base end of the intermediate cavity section (5). This first clip operation in fact also prevents any subsequent upward axial motion of the clip member (17), as the flange engaged with the notch retains the clip member.

As illustrated in FIG. 3, when the above mentioned external action on the valve core (7) stops, the clip member (17) is retained at the level of the flange (19) radially engaged in the notch (11), the biasing member (12) then pushes axially upwardly the valve core (7) up to disengage the base portion (8) of the valve core (7) from the top shoulder (18), thus allowing the top end of the clip member (17) to freely move radially inwardly, due to relaxation of the elastic pressing force on the peripheral external surface of the base portion (8). As a result, the annular top end of the clip member (17) is now below the base portion (8) of the valve core and in position to block a subsequent axially downward motion of the valve core. Indeed, in case of any subsequent axially downward motion of the valve core (7), the top end of the clip member will contact the base portion of the valve core and stop any downward motion due to the flange (19) of the base end of the clip member being blocked by the rim portion (10) at the base end of the intermediate cavity section (5). Thus, the above described single use valve, when included in a connector mounted on a tank, can be used for initially filling the tank by pressing on the valve core (7) so as to make the valve core move axially, for compressing the biaising member (12) and engaging the flange (19) of the clip member (17) into the notch (11) while opening the passageway (14) to allow a flow through the central cavity (3) toward the tank. Once the initial filling operation is completed, the pressing on the valve core (7) stops (or at least reduces) so that the biasing member (12) presses on the base portion (8) of the valve core (7) and the valve core moves axially backward up to disengage the base portion (8) of the valve core from the top shoulder (18) of the clip member (17) and closes the passageway (14). As the disengaged top end of the clip member (17) has freely moved radially inwardly and now blocks any axial motion of the valve core toward the intermediate cavity, while the biasing member (12) maintains the base portion (8) of the valve core pressed against the first shoulder (6), thus closing the passageway (14), it is neither possible to refill the tank nor subsequently extract a fluid from the tank through the passageway (14). Moreover, the single use valve blocked in a closed position proves that the only one authorized filling operation has been completed.

In the case of a previously filled tank (like for example an ink tank, or cartridge, for a printer) equipped with a connector including the above single use valve for extraction operation of the tank's content, said single use valve allows only one extraction operation. In this case, the extraction operation is performed by pressing on the valve core (7) so as to make the valve core move axially, to compress the biasing member (12) and to engage the flange (19) of the clip member (17) into the notch (11) while opening the passageway (14) to allow a flow through the central cavity (3) from the tank (for example, to feed a printing head of a printer with ink contained in the tank). Once the initial extraction operation is completed, the pressing on the valve core (7) stops (or at least reduces) so that the biasing member (12) presses on the base portion (8) of the valve core (7) and the valve core moves axially backward up to disengage the base portion (8) of the valve core from the top shoulder (18) of the clip member (17) and closes the passageway (14). As the disengaged top end of the clip member (17) has freely moved radially inwardly and now blocks any axial motion of the valve core toward the intermediate cavity, while the biasing member (12) maintains the base portion (8) of the valve core pressed against the first shoulder (6), thus maintaining the passageway (14) closed, it is neither possible to subsequently extract a fluid from the tank nor refill the tank through the passageway (14). Moreover, the single use valve being now blocked in a closed position proves that the only one authorized extraction operation has been completed.

Another embodiment of a single use valve (1) according to the disclosure is illustrated in FIGS. 5 to 8. Corresponding features (at least functionally) in FIGS. 5 to 8 to those in FIGS. 1 to 4 will be given the same reference number.

The single use valve device (1) includes a housing (2) having a central cavity (3) extending axially within the housing portion between its longitudinal ends and receiving and retaining valve components as described below. The valve housing and/or valve components may be made of any conventional material (e.g., plastics and/or polymers, metal) that meet valve specifications for a particular application. Any type or types of fluids (e.g., liquid, gas or powder) may be utilized with the valve device. Central cavity (3) includes an upper (or first) cavity section (4) extending from the valve housetop surface to an intermediate (or second) cavity section (5). A base end of the upper cavity section has a radially inwardly extending first shoulder (6).

A valve core (7) (valve member) is operable to move axially within the upper and intermediate cavity sections (see also FIGS. 6 and 7) and has a base portion (8) of extended diameter which is operable to move axially within the intermediate cavity section (5). The valve core (7) is stopped by the first shoulder (6) when moving upward in direction of the upper cavity section (4). A base end of the intermediate cavity section has a radially inwardly extending shoulder (9) defining a rim portion (10). A base end part of the intermediate cavity section (5) comprises at its peripheral inner face part a plurality of bevelled notches (21) forming a saw-tooth profile of a peripheral rack (11a) (extending axially).

A biasing member (12) is provided (illustrated by a coil spring in the figures) between the base portion (8) of the valve core (7) and the rim portion (10) of the housing (2) (the rim portion bearing the applied load due to the biasing member (12)). The base end portion (8) of the valve core (7), when pressed against the first shoulder (6) by the biasing member (12), closes a passageway (14) and prevents any flow in any direction between the upper cavity section (4) and the intermediate cavity section (5). The valve device (1) may further include a resilient sealing member (15), for example, of the type of an O-ring provided within a groove (16) extending around an outer peripheral section of the valve core (7). This sealing member (15) ensures that a fluid tight seal is maintained at the interface between the valve core and the intermediate cavity section (5).

The base portion (8) of the valve core (7) has at least one radially outwardly extending projection (13) (cooperating blocking surface) forming a bevelled tooth. An annular double rack member (27), made of a resilient elastic material (e.g., plastics, metal), comprises an outer peripheral sawtooth profile (17a) operable to engage the bevelled notches (21) of the saw-tooth profile of the peripheral rack (11a) when mounted in the intermediate cavity section (5). The corresponding saw-tooth profiles (17a) and (11a), and the elasticity of the double rack member (17), are such that the double rack member (17) can be driven to move axially (with friction) from a first (upper) position, close to the first shoulder (6), to a second (lower) position close to the rim portion (10) of the housing. However, the shape of the outer peripheral saw-tooth profiles (17a) and that of the saw-tooth profile (11a) of the peripheral rack are adapted so that the double rack member (27) cannot then axially move back toward the first shoulder (6).

The double rack member (27) also comprises an inner peripheral saw-tooth profile (17b) (see also FIG. 8). When the double rack member (27) is mounted in the intermediate cavity section (5), its saw-tooth profile (17a) engaging the saw-tooth profile of the peripheral rack (11a), the projection (13) of the base portion (8) of the valve core (7) engages the inner peripheral saw-tooth profile (17b) of the double rack member (27) and the shape of the projection (13) and that of the teeth forming the inner peripheral saw-tooth profile (17b) are adapted so that, in case the valve core (7) moves axially toward the rim portion (10), the projection (13) drives the double rack member (27) toward said rim portion (10), and, in case the valve core (7) moves back axially toward the first (upper) cavity section (4), the projection (13) then rubs against the inner peripheral saw-tooth profile (17b) without blocking motion of the valve core. The teeth of the inner peripheral saw-tooth profile (17b) form a plurality of blocking surfaces and the projection (13) form a cooperating blocking surface. The projection (13) and/or the teeth of the inner peripheral saw-tooth profile resiliently spring radially from a relatively compressed state to a blocking position as the valve core (7) moves backward toward the first shoulder (6) so as to radially overlap, thereby blocking the valve core (7) from returning in the other direction toward the rim portion (10).

Figure 5:
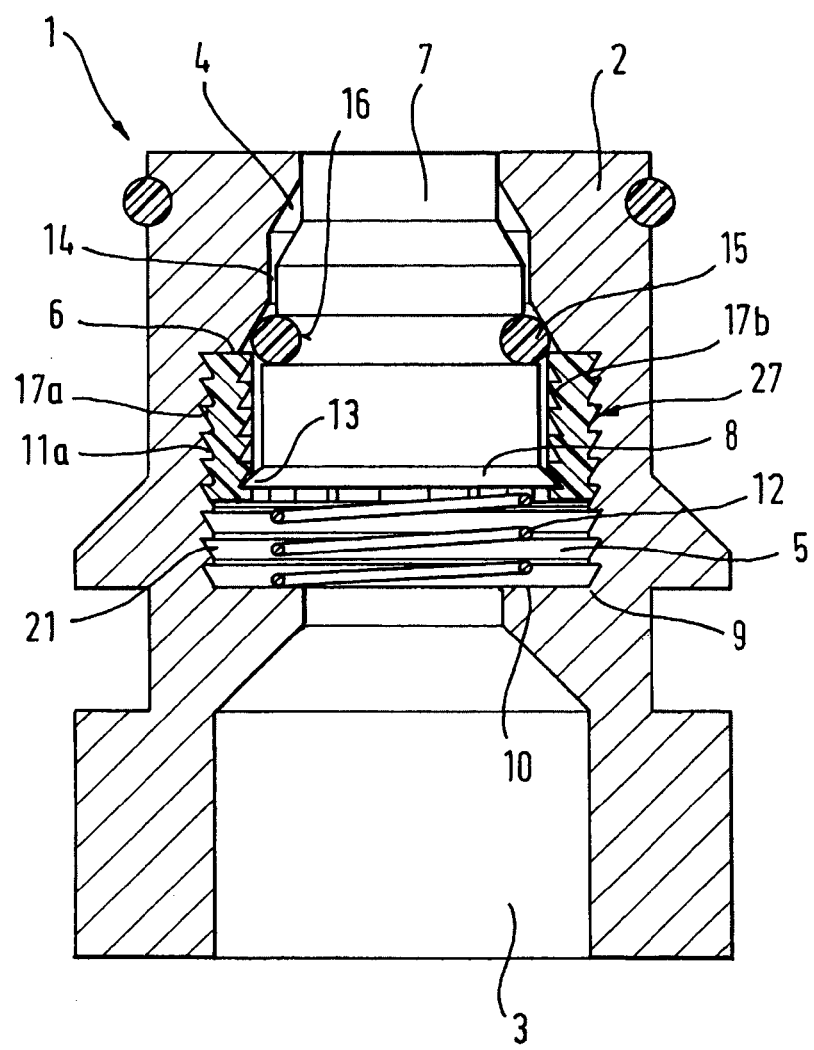
FIG. 5 illustrates a sectional view of a single use valve according to another embodiment of the disclosure in an initial position.

FIG. 5 illustrates an initial closed position of the single use valve (1): the valve core (7) fastened to the biasing member (12) resting on the rim portion (10), is pressed against the first shoulder (6) and the sealing member (15) closes the passageway (14). The double rack member (27), its outer peripheral saw-tooth profile (17a) engaging the saw-tooth profile of the peripheral rack (11a), is then in the first position in which the projection (13) of the valve core engages its inner peripheral saw-tooth profile (17b).

Figure 6:
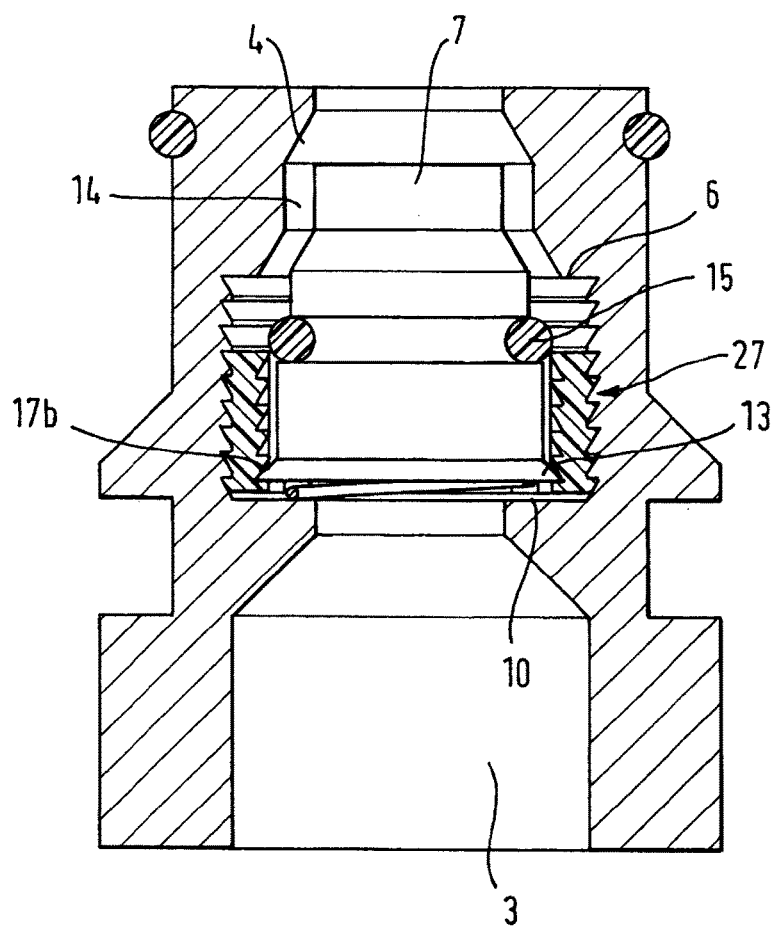
FIG. 6 illustrates a sectional view of the single use valve of FIG. 5 in an open position.

As illustrated in FIG. 6, when the valve core (7) is axially moved downward (i.e., toward the intermediate cavity section (5)), under external mechanical action exerted on its top part, thus opening the passageway (14), and allowing flow between the upper cavity section (4) and the intermediate cavity section (5), the double rack member (27) is driven downward until it stays blocked, retained at the level of the rim portion (10), due to the projection (13) engaging the inner peripheral saw-tooth profile (17b) and thus driving the double rack member (27) downward.

Figure 7:
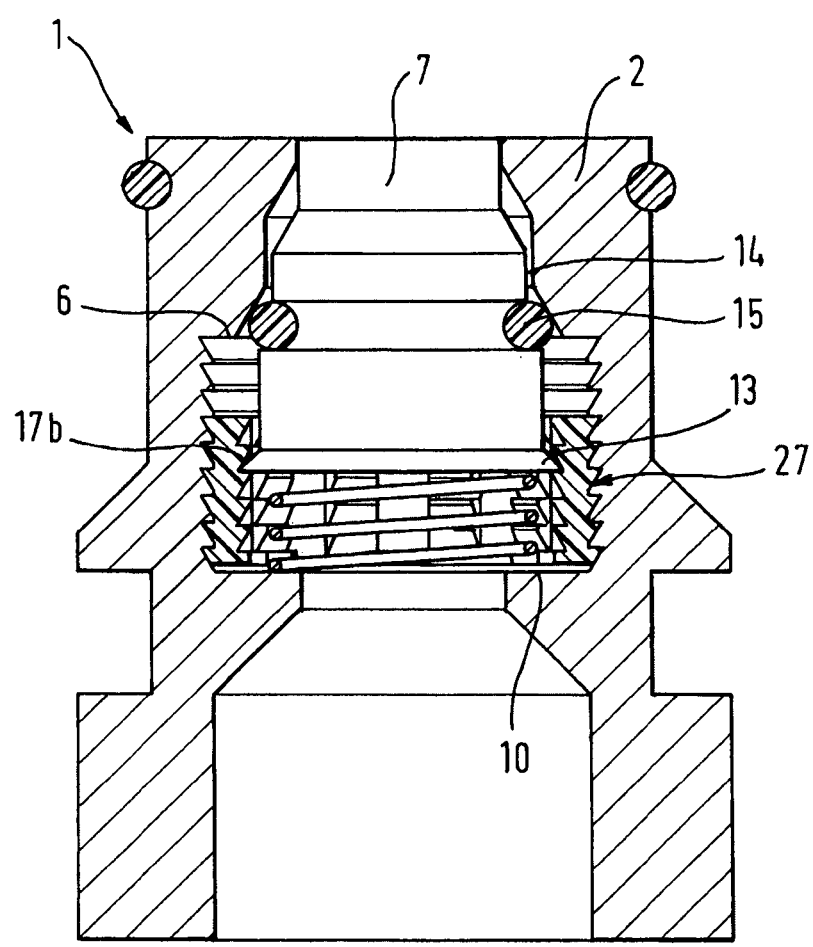
FIG. 7 illustrates a sectional view of the single use valve of FIGS. 5 and 6 in a blocked position.

As illustrated in FIG. 7, when the above mentioned external action on the valve core (7) stops (for example in case filling or extraction operation trough the valve ceases), the valve core (7) axially moves back (i.e., upward, toward the upper cavity section (4)), as the biasing member (12) then pushes axially upwardly the valve core (7) up to disengage the projection (13) of the base portion (8) of the valve core (7) from the bevelled notches of the inner peripheral saw-tooth profile (17b) of the double rack member (27). During back motion of the valve core (7) the double rack member (27) remains blocked at the level of the rim portion (10) due to the mechanical action of the engaged saw-tooth profile of the peripheral rack (11a) on the outer peripheral saw-tooth profile (17a) of the double rack member (27). The backward motion of the valve core (7) stops when the sealing member (15) presses against the first shoulder (6) and closes the passageway (14), while the projection (13) engages a bevelled notch of the saw-tooth profile (17b) of the inner face of the double rack member (27) and remains blocked at this position. Thus, even if a mechanical action is exerted on the valve core (7) so as to push it downward, the valve core remains blocked in the closed position. No subsequent refill or extraction operation through the single use valve is then possible.

Thus, the above described single use valve, when included in a connector mounted on a tank, can be used for initially filling the tank by pressing on the valve core (7) so as to make the valve core move axially, compress the biasing member (12) while driving downward the double rack member (27) up to block it at the level of the rim portion (10), thus opening the passageway (14) to allow a flow through the central cavity (3) toward the tank. Once the initial filling operation is completed, and the pressing on the valve core (7) stops (or at least reduces) so that the biasing member (12), which presses on the base portion (8) of the valve core (7), moves the valve core axially backward up to make the projection (13) at the base portion (8) of the valve core (7) rubbing (with the projection (13) and/or the teeth of the inner face (17b) successively resiliently compressing and springing back radially into a blocking position) against the inner face (17b) of the double rack member (27) and closes the passageway (14). The passageway (14) then remains closed, as the projection (13) now engages a tooth of the inner peripheral face (17b) of the double rack member (17) so as to prevent any downward motion of the valve core (7). Consequently, it is neither possible to refill the tank nor subsequently extract a fluid from the tank through the passageway (14). Moreover, the single use valve blocked in a closed position proves that the only one authorized filling operation has been completed.

In case a previously filled tank (like, for example, an ink tank, or cartridge, for a printer) equipped with a connector including the above single use valve for extraction operation of the tanks content, said single use valve allows only one extraction operation. In this case, the extraction operation is performed by pressing on the valve core (7) so as to make the valve core moving axially, to compress the biasing member (12) and to drive the double rack member (27) downward, toward a position at which the double rack member (27) remains blocked, while opening the passageway (14) to allow a flow through the central cavity (3) from the tank (for example, to feed a printing head of a printer with ink contained in the tank). Once the initial extraction operation is completed, the pressing on the valve core (7) stops (or at least reduces) so that the biasing member (12) presses on the base portion (8) of the valve core (7) and the valve core moves axially backward and closes the passageway (14). As the projection (13) of the double rack member (27) then engages a tooth of the top end of the inner face (17b) so as to block any axial motion of the valve core (7) toward the intermediate cavity (5), while the biasing member (12) maintains the base portion (8) of the valve core (7) pressed against the first shoulder (6), thus maintaining the passageway (14) closed. In the permanently closed (blocked) state, it is neither possible to subsequently extract a fluid from the tank nor refill the tank through the passageway (14). Moreover, the single use valve being now blocked in a closed position proves that the only one authorized extraction operation has been completed.

Referring to FIGS. 9 to 11, a modification of the embodiment of FIGS. 5 to 8 is shown in which a second valve member (30) is provided in the bore (4) of the valve housing (2). The second valve member (30) is biased into a closed position as shown in FIGS. 9 and 11 by way of a biasing member (31). A sealer, such as a sealing ring, is provided between the valve member (13) and the valve housing (2) in order to provide a sealing closed position. A shoulder is provided in the bore through the valve housing (2) to support the biasing member (31), which is shown in the form of a "spring", against which the biasing member (31) bears to bias the second valve member (30) into the closed position. The second valve member (30) is arranged behind the first valve member (7) with respect to the front of the valve (1) being that side of the valve (1) that allows access by an external connector in order to move the first valve member (7) from the initial closed position to an open position. The first valve member (7) includes a tail portion (34) depending from the valve member (7) that is arranged to come into contact with, and push open, the second valve member (30) when the first valve member (7) is in the closed position as shown in FIG. 10. Both the first valve member (7) and the second valve member (30) serve to seal a passage for fluid through the valve member (1), thereby providing an enhanced sealing effect, particularly with regard to drip prevention as a result of the redundancy in valve members (7, 30). In use, an external connector will provide mechanical action on the first valve member (7) to place the first valve member (7) in the open position as shown in FIG. 10. Since the tail member (34) of the first valve member (7) acts on the second valve member (30), opening of the first valve member (7) also serves to open the second valve member (30). When the mechanical action by the external valve connector is removed, the first valve member (7) is biased by the first spring (12) to move the first valve member (7) to return to the closed position and to lock the first valve member (7) in the closed position by some form of blocker. In the embodiments shown in FIGS. 9 to 11, the blocker is by way of a rack (17*b*) as shown in FIGS. 5 to 8 comprising at least one tooth, but could equally be the locking clip (17) shown in FIGS. 1 to 4 or the bolt and recess arrangement of FIGS. 12 to 14 or some other blocking arrangement. In returning to the closed position, the valve member (7) releases the second valve member (30) to move from the open position shown in FIG. 10 to the closed position shown in FIG. 11, such that when the first valve member (7) is in the permanently closed position shown in FIG. 11, the second valve member (30) is also in its closed position, thereby providing two closed valve sealing members (7, 30) for sealing the passage through the valve to provide enhanced drip prevention.

Further modifications can be envisaged by the skilled person. Specific examples of such further modifications may be a modification to the embodiment of FIGS. 5 to 8 such that the plurality of teeth of the inner rack (17*b*) could be replaced to have fewer teeth. For example, a first tooth could be provided as shown as the bottom tooth engaged by the projection (13) in FIG. 5 to allow the valve member (7) to engage the locking member (27) so that they move axially together when the valve member (7) moves from the initial closed position to the open position. A second tooth could be provided as shown by the tooth engaged by the projection (13) in FIG. 7 to provide a blocking surface. One or more or all of the remaining teeth could be excluded.

A further modification of the single use valve is shown in FIGS. 12 to 14. Corresponding reference signs will be used for functionally equivalent components to those shown in FIGS. 1 to 11.

The valve (1) of FIGS. 12 to 14 has a bore (3) defined therethrough that accommodates a valve member (7) for movement between a closed position (FIG. 12) in which a fluid passage through the valve (1) is closed, an open position (FIG. 13) in which the fluid passage is open and a permanently closed position (FIG. 14) in which the valve member (7) is immobilised in a position preventing fluid from passing through the valve (1).

The valve (1) comprises a locking member (43) disposed within the bore (3) and located around an outer periphery of the valve member (7). The locking member (43) is generally shaped as a hollow cylinder and is located at a base end of the valve member (7). The locking member (43) includes a flange (44) that overlaps with a base end side of the valve member (7) such that axial movement of the valve member (7) in the bore (3) from the closed position of FIG. 12 to the open position of FIG. 13 is transmitted such that the locking member (43) moves from an initial position shown in FIG. 12 to a locked position shown in FIGS. 13 and 14.

The valve (1) comprises a holding bolt (49) disposed in the housing (2) that is spring biased to move inwardly to a holding position as shown in FIGS. 13 and 14 for holding the locking member (43) in the locking position. The spring bias is provided by holding spring 45. The locking member (43) includes a holding recess (41) for accommodating movement of the holding bolt (49) into the holding position. The holding bolt (49) only moves into the holding position once the holding recess (41) in the locking member (43) is aligned therewith. The holding recess (41) aligns with the holding bolt (49) when the locking member (43) is disposed in the locking position shown in FIGS. 13 and 14. Although the holding bolt and recess (49, 41) have been referred to in the singular above, the figures show, and it is possible to provide, a plurality of such bolt and recesses distributed around the locking member (43) and housing (2).

The valve (1) further comprises a blocking bolt (46) located in the valve member (7) and which is biased by a spring (40) into a blocking position as shown in FIG. 14. The locking member (43) includes a cooperating blocking recess (47) to accommodate radially outward movement of the blocking bolt (46) to define the permanently closed state of the valve (1) as shown in FIG. 14 in which the valve member (14) cannot be moved out of the closed, fluid sealing, position. The blocking recess (47) and the blocking bolt (46) only align with one another when the locking member (43) is held in the locking position of FIG. 13 and when the valve member (7) has returned from the open position of FIG. 13 to the closed position of FIG. 14. In the foregoing description, the blocking bolt (46) and the blocking recess (41) are given in the singular, but it is possible, and the figures show, to implement this embodiment by way of a plurality of blocking bolts and recesses distributed circumferentially around the valve member (7) and the locking member (43). In the embodiment of FIGS. 12 to 14, a somewhat different arrangement of the spring or biasing member (12) is shown to that of the embodiments of FIGS. 1 to 11. In particular, a spring support (50) is secured in the bore (3) and fixed to the housing (2). The spring support (50) includes a central stem about which the spring (12) is disposed and which also includes a ledge upon which a base end of the spring (3) is supported. The valve member (7) includes a central recess (42) for accommodating the opposite end of the spring (3). The spring or biasing member (12) serves the function of biasing the valve member (7) in the open position of FIG. 13 to return to the closed position of FIGS. 12 and 13. The valve (1) of FIGS. 12 to 14 may be used as follows. An ink tank that is filled or substantially filled with a valuable fluid, such as security ink, is fitted with a single use valve (1) as shown in FIGS. 12 to 14. An external valve connector is operated with the single use valve to mechanically actuate the valve member (7) to move from the closed position of FIG. 12 to the open position of FIG. 13. The valve member (13) in moving from the closed position to the open position, serves to move the locking member (43) from the initial position of FIG. 12 to the locking position of FIG. 13 as a result of the interaction between the valve member (7) and the locking member (43) provided by the flange (44). The locking member (43) is locked in the locking position of FIG. 13 by way of holding bolts (49) being able to spring radially inwardly to engage holding recesses (41) as the holding recesses (41) move into alignment with the holding bolts (49) when the locking member (43) moves to the locking position. The locking member (43) is secured fixed relative to the housing (2) in the locking position by way of the holding bolts (49) engaging the holding recesses (41). In the open position of FIG. 13, fluid is able to pass through the valve (1) to extract the fluid from the tank, or some other container associated with the valve.

Upon removal of the external valve connector, the spring (12) urges the valve member (7) from the open position of FIG. 13 to the closed position of FIG. 14, thereby bringing the blocking bolts (46) into alignment with the blocking recesses (47) such that the blocking bolts (46) spring outward into engagement with the blocking recesses (47) under force of the blocking spring (40). The blocking position of the blocking bolts (46) is shown in FIG. 14. The valve member (7) is immobilised in the closed, fluid sealing position of FIG. 14 because of the blocking function of the blocking bolts (47), thereby preventing the valve member (7) from being opened again such that further extraction and filling operations through the valve (1) are not possible.

The use of the valve 1 has been described here with respect to an extraction operation. However, the valve 1 is equally applicable for the process of filling a container or tank with a fluid (e.g., liquid), such as a valuable fluid, such as security ink. In particular, the valve 1 is opened by mechanical actuation from an external valve connector, fluid is filled into the container or tank through the open valve 1 and the valve member returns under bias of the biasing member 12 to the closed position at which the valve member is immobilised by the blocker described herein. The valve 1 is thereby rendered inoperative to a further filling operation and an extraction operation.

Modifications of the embodiment of FIGS. 12 to 14 can be envisaged. For example, the bolt and recess mechanism could both, or at least one of them, be replaced by some other mechanism that springs into a holding/blocking position upon alignment of cooperating parts. Also, the second valve member (30) of FIGS. 9 to 11 could be provided in the bore (3) to provide drip prevention enhancement as described above with respect to FIGS. 9 to 11.

Thus, in the above mentioned embodiments, any subsequent attempt to use the valve for refill and/or extraction operation will be prevented. Moreover, in case the valve is forced to nevertheless execute any subsequent refill and/or extraction operation, the clip member will be damaged and will constitute a proof of the forcing. Consequently, the single use valve according to the disclosure may serve as a tamper evident closing device.

Another advantage of a container equipped with the single use valve according to the disclosure, once the valve is blocked in the closed position as described above and thus prevents extraction of fluid from the container, is that the valve prevents any fluid dripping. This is particularly interesting in case, for example, of an ink tank disposed in a printer: once the single use valve has been blocked in the closed position in order to remove the tank from the printer, no ink can further flow from the tank through the valve. Thus, the single use valve according to the disclosure may also be used as a spill-proof valve.

The invention claimed is:

1. A single use valve comprising:
a valve housing defining a bore therethrough;
a valve member moveable in the bore relative to the valve housing from a closed position that sealingly closes the valve such that fluid is not able to pass through the valve, to an open position to allow fluid to pass through the valve, wherein the valve further comprises:
a locking member arranged to move with the valve member moving to the open position to be placeable in a locked position, which blocks the valve member after the valve member has moved back from the open position to the closed position, thereby configuring the valve into a permanently closed state, thus preventing the passage of fluid through the valve after a single motion of the valve member from the open position to the closed position,
wherein the locking member and the valve member are engaged so that the locking member moves with the valve member as the valve member moves from the closed position to the open position to place the locking member in the locked position,
wherein the valve is configured so that the valve member is immovably locked in the closed position so that the valve member is not able to be moved within the bore after the valve member has returned to the closed position from the open position, to thereby define the permanently closed state of the valve.

2. The single use valve of claim 1, wherein the valve member is biased to return to the closed position.

3. The single use valve of claim 1, wherein the locking member and the valve member cooperate such that once the locking member is moved to the locking position and the valve member is in the closed position having moved from the open position, a blocking member is released to spring to a blocking position.

4. The single use valve of claim 1, comprising a blocking arrangement structured to block the valve member in the closed position after moving from the open position to the closed position to place the valve in the permanently closed state.

5. The single use valve of claim 1, further comprising a blocking member configured to spring or otherwise move into a blocking position by way of movement of the valve member as the valve member moves from the open position to the closed position to place the valve in the permanently closed state.

6. The single use valve of claim 5, wherein movement of the valve member from the open position to the closed position releases the blocking member from a strained state to spring into the blocking position.

7. The single use valve of claim 1, wherein the locking member is cooperatively moveable with the valve member from an initial position to a locking position, and the valve includes at least one holder structured and arranged to hold the locking member in the locking position.

8. The single use valve of claim 7, wherein the at least one holder is provided as at least one cooperating projection and recess.

9. The single use valve of claim 7, wherein the locking member and the valve member are held fixed to one another and move together as the valve member moves from the closed position to the open position, thereby moving the valve member from the initial position to the locking position.

10. The single use valve of claim 9, wherein the at least one holder is structured and arranged for holding the locking member in the locking position so that the valve member is moveable relative to the locking member as the valve member moves from the open position to the closed position.

11. The single use valve of claim 10, wherein the valve includes at least one blocking surface arranged to prevent movement of the valve member to define the permanently closed position, wherein the at least one blocking surface includes a part that is only engaged by the valve member when the valve member has moved to the closed position from the open position and thus moved relative to the locking member as a result of the locking member being held in the locking position by the at least one holder, arranged so that the at least one blocking surface springs into a blocking position as the valve member moves past the at least one blocking surface in moving to the closed position from the open position.

12. The single use valve of claim 1, comprising a plurality of blocking surfaces spaced apart in a direction of moving from the open position to the closed position of the valve member to prevent the valve member from moving back toward an open position after the valve member has moved from the open position toward the closed position.

13. The single use valve of claim 12, wherein the plurality of blocking surfaces comprise adjacent sets of a recess and a protrusion spaced in the direction of the valve member moving from the open to the closed position.

14. The single use valve of claim 12, wherein the valve member includes at least one cooperating blocking surface that is engageable with the plurality of blocking surfaces to prevent movement of the valve member toward the open position.

15. The single use valve of claim 14, wherein at least one of the at least one cooperating blocking surfaces of the valve member and the plurality of blocking surfaces is configured to spring into a blocking position as the valve member moves from the open position to the closed position.

16. The single use valve of claim 12, wherein the plurality of blocking surfaces are structured and arranged to allow the valve member to move by rubbing there past from the open to the closed position, but to prevent movement from the closed to the open position.

17. The single use valve of claim 12, wherein the plurality of blocking surfaces is provided on the locking member.

18. The single use valve of claim 1, comprising a plurality of holding surfaces spaced apart in the direction of movement from the closed position to the open position of the valve member, the plurality of holding surfaces serving to hold the locking member in a plurality of respective positions reached by movement of the locking member with the valve member in the direction from the closed position to the open position of the valve member, wherein the holding surfaces hold the locking member to allow the valve member to move relative to the locking member in the direction from the open position to the closed position.

19. The single use valve of claim 1, wherein the valve further comprises a sealer that is disposed to seal the passage closed when the valve member is in the closed position.

20. The single use valve of claim 19, wherein the sealer is carried on the valve member so as to be compressed between the valve member and a cooperating part of the housing when the valve member is in the closed position.

21. The single use valve of claim 1, wherein the valve further comprises:
a spring that biases the valve member in the direction of movement from the open position to the closed position; and
a shoulder or other spring support in the passage that supports the spring.

22. The single use valve of claim 1, wherein the locking member comprises a locking hollow cylinder disposed at least partly about the valve member.

23. The single use valve of claim 22, wherein an outer peripheral portion of the valve member engages an inner peripheral portion of the locking cylinder such that the valve member and the locking cylinder move together as the valve member moves from the closed position to the open position.

24. The single use valve of claim 23, wherein an outer peripheral portion of the locking cylinder springs outward to engage an inner peripheral stepped portion of the housing defining the bore to hold the locking member in position once the locking cylinder has moved to a locking position to allow the valve member to disengage from the locking cylinder to move relative to the locking cylinder as the valve member moves from the open position to the closed position.

25. The single use valve of claim 1, wherein the valve member is a first valve member and the valve further comprises a second valve member that is moveable between an open position and a closed position, wherein, in the open position, the second valve member allows fluid to pass through the valve, and in the closed position, the second valve member closes the passage of fluid through the valve.

26. The single use valve of claim 25, wherein the first valve member and the second valve member cooperate so that movement of one of the first valve member and the second valve member toward the open position is transmitted to movement of the other of the first valve member and the second valve member.

27. The single use valve of claim 25, wherein the second valve member is arranged past the first valve member in the direction of moving the first valve member from the closed position to the open position.

28. The single use valve of claim 25, wherein the second valve member is biased to move from the open position to the closed position.

29. The single use valve of claim 19, wherein the sealer comprises a sealing ring.

* * * * *